June 15, 1971 F. L. BOYS 3,585,002
FLUID ANALYSIS BY GAS CHROMATOGRAPHY EMPLOYING MULTIPLE
CARRIER GASES AND MULTIPLE COLUMNS
Filed Oct. 22, 1965 2 Sheets-Sheet 1

INVENTOR.
FAY L. BOYS
BY
McLean, Morton and Boustead
ATTORNEYS

INVENTOR.
FAY L. BOYS
McLean, Morton
and Boustead
BY ATTORNEYS

United States Patent Office 3,585,002
Patented June 15, 1971

3,585,002
FLUID ANALYSIS BY GAS CHROMATOGRAPHY EMPLOYING MULTIPLE CARRIER GASES AND MULTIPLE COLUMNS
Fay L. Boys, Peotone, Ill., assignor to Sinclair Research, Inc., New York, N.Y.
Filed Oct. 22, 1965, Ser. No. 500,638
Int. Cl. B01d 15/08; G01n 31/08
U.S. Cl. 23—232                 9 Claims

ABSTRACT OF THE DISCLOSURE

A fluid is analyzed by introducing measured samples into two identical chromatographic columns in each of which a different carrier gas is used. One carrier gas has a relatively high thermal conductivity, e.g. hydrogen or helium, and the other has a relatively low thermal conductivity, e.g. nitrogen. The flow of carrier gas through each column is continued to succesively elute the constitutents of the samples and the binary mixture of carrier gas and sample constituents discharged from each column is passed to separate detection elements, e.g. thermal detection elements, each responsive to changes in the gas composition passed therethrough. The responses from the separate detection elements are combined to provide a composite representation of the components of the samples.

---

The present invention relates to gas chromatography and in particular to a method and apparatus for analyzing fluid samples having constituents which physical properties which vary over a wide range.

Gas chromatography has proven to be a valuable tool for analyzing mixtures of volatile compounds. In the usual method a gaseous sample is introduced to a column which is packed with a sorptive material wherein the sample constituents are separated by gas-liquid partition or gas-solid adsorption, e.g. molecular sieve. A carrier gas is used which introduces the sample to the column and successively elutes the constituents from the column and carries them to a detection element which is responsive to changes in the composition of the gases passing through it. Most frequently the detection element used in a thermal conductivity cell. These systems have heretofore been subject to the disadvantage that poor results are obtained when a sample includes constituents which are the same as the carrier gas or which have similar physical properties to that of the carrier gas upon which detection is based, e.g., thermal conductivity.

It is the object of this invention to provide a system for gas chromatographic analysis of samples which include constituents having physical properties similar to those of the usual carrier gases upon which detection is based, which system provides sensitive analyses over the entire range of sample constituents.

It is a further object of this invention to provide a system for gas chromatographic analysis which is flexible and can be readily modified to accomplish a wide variety of analyses.

The present invention provides a method and apparatus for gas chromatographic analysis wherein measured samples of a fluid to be analyzed are introduced concurrently to two substantially identical, parallel, chromatographic columns by two different carrier gases, the flow of carrier gases being continued to successively elute the sample constituents from the columns. The binary mixtures of carrier gas and sample constituents discharged from each column are then passed through two separate detection elements and the responses from the detection elements, usually in the form of resistance changes in each detection element, are combined and passed to an indicator which provides a single analytical report for each gas analyzed.

The two carrier gases used are substantially different in their respective physical properties upon which detection is based. For example, when the detection method used consists of a thermal conductivity cell a carrier gas such as hydrogen or helium having a high thermal conductivity is used in one column, and a gas, such as nitrogen, having a much lower thermal conductivity is used in the other column. The detection element through which the hydrogen or helium carrier gas passes will provide excellent responses for constitutents having relatively low thermal conductivities but poor responses or none at all for constituents which are the same as the carrier gas or which have high thermal conductivities approximating that of the carrier gas. On the other hand the detector through which the nitrogen carrier gas passes will provide excellent responses for constituents having high thermal conductivities approximating those of hydrogen and helium and little or no response for constituents having relatively low thermal conductivities. By combining the responses of the two detection elements, excellent analyses throughout the entire range of constituents are obtained.

The present invention is equally suitable for use in association with other detection methods such as gas density detectors and cross section ionization detectors. Thus, if gas density detectors are to be used, one carrier gas would be selected to have a high density, and the other carrier gas to have to low density; and if cross section ionization detectors are to be used one carrier gas would be selected to have a large ionization cross section and the other carrier gas to have a small ionization cross section. However, since thermal conductivity detectors are most frequently used for stream analyzers to which the present invention is particularly well suited, the description herein will proceed with reference to such thermal conductivity detectors.

The fluid analyzed by the method of this invention will most frequently be a gas and this description will be primarily directed to the analysis of gaseous samples. It will be understood, however, that the invention is equally applicable to analyses in which it is desired to measure dissolved gases such as hydrogen in liquid samples. The amount of samples introduced to each column, moreover, will normally be identical so that the responses from one detection element can be correlated directly with the responses from the other detection element. However, when it is expected that the constituents to be measured by one of the detection elements are present in minute amounts while those to be measured by the other detection element are present in large amounts, the amount of sample necessary to provide sensitive analysis in the former detection element would cause inordinate responses from the latter detection element. In this case, different amounts of samples are introduced to the two columns and the responses from each detection element are calibrated accordingly.

The column packings used in the practice of the present invention may be any of the conventional packings presently used. Suitable examples of these include activated carbon, alumina, and silica gel for absorption separations; inert carriers such as crushed firebrick, diatomaceous earth, and ceramic beads upon which are disposed high boiling organic liquids for gas-liquid partitions; and partially dehydrated metallo-alumino silicated zeolitic absorbents for molecular sieve separations. Typical high boiling organic liquids presently in use for gas-liquid partitions include mineral oil, di-octyl phthalate, di-nonyl phthalate, silicone fluids, tricresyl phosphate, di-butyl phthalate and 4-benzylpyridine.

The column packing selected for any particular analysis will be determined by the component resolution desired. For example, an absorption system using a silica gel column provides excellent analysis for hydrogen and methane occurring in samples which also contain oxygen, nitrogen and carbon monoxide. A silane treated (Siliclad) silica gel column provides excellent resolution of hydrogen, methane, ethane and ethylene from samples which also contain oxygen, nitrogen and carbon monoxide. Molecular sieve having a pore diameter of five angstroms provides excellent resolution of hydrogen, oxygen, nitrogen and methane and carbon monoxide. For higher hydrocarbons, gas-liquid partition systems such as 4-benzylpridine on crushed firebrick are preferred.

Although thermal conductivity cells are well known in the art, a brief description of their operation will be helpful. The conventional thermal conductivity cell employs the Wheatstone bridge, two adjacent arms of which are detection elements consisting of enclosed tungsten or platinum wires. One detection element acts as a reference chamber into which a reference gas flows, i.e. pure carrier gas; and the other detection element acts as a sample chamber through which a binary mixture of carrier gas and sample constituents flows, i.e., the gases discharged from the chromatographic column. When a gas is in contact with a heated platinum wire of the cell, the wire is cooled to an extent which depends on the thermal conductivity of the gas, and, when the composition of the gas flowing across the wire changes, the thermal conductivity of the gas and its cooling effect upon the wire change, and the temperature of the platinum wire changes correspondingly. As the temperature of the wire changes its electrical resistance changes and these changes appear as unbalance in the Wheatstone bridge as indicated by a recording potentiometer connected across it. The reference wire provides compensation for changes in the resistance of the sample chamber wire due to factors such as bridge voltage or ambient temperature, i.e., changes other than those due to changes in the composition of the gas flowing through the sample chamber.

In the practice of the method of the present invention, utilizing parallel identical columns into which measured samples have been introduced by different carrier gases, it has been found that reference chambers are unnecessary and that the binary gas mixture discharged from each column can be passed through an associated sample chamber, each sample chamber being a detection element comprising one arm of a Wheatstone bridge. Since the two chromatographic columns are operated under identical conditions, except for the carrier gas, the detection elements, after an initial adjustment to allow for differences in thermal conductivity between the two carrier gases, act as references for each other. In this manner variations in the resistance of the wires in each detection element caused by variations in the composition of the binary gas mixtures are fed directly to a single indicator. Since the chromatographic columns are substantially identical, corresponding sample constituents are discharged from each at approximately the same time and therefore the resistance change caused in each detection element by a particular sample constituent is added directly to that caused simultaneously in the other detection element providing a single cumulative response for each constituent at the recording potentiometer or indicator.

For a further description of the present invention reference is made to the appended drawings of which:

FIG. 1 is a schematic of a portion of a chromatographic analyzer incorporating the principles of the present invention.

FIG. 1-A is a single graphic trace combining the separate traces shown in FIG. 1.

FIG. 2 is a schematic of a complete chromatographic analyzer according to the present invention.

FIG. 2-A is a schematic of the sampling valve of FIG. 2 shown in the "charge" position.

Figure 1:
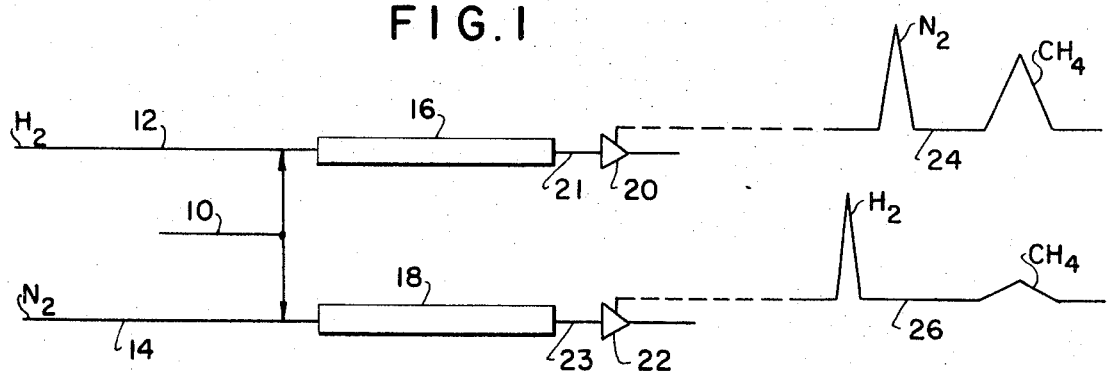
Figure 1A:
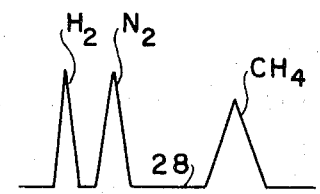

Referring to FIG. 1 a sample inlet 10 is shown by which samples are introduced into parallel carrier gas streams passing through conduits 12 and 14. The samples are carried by carrier gases in conduits 12 and 14 into parallel chromatographic columns 16 and 18 from which they are eluted by the carrier gases and carried through two detection elements 20 and 22 which are connected to the discharge ends of columns 16 and 18 by conduits 21 and 23. Graphic traces 24 and 26 representing responses in the form of electrical resistance changes received from detection elements 20 and 22 are shown to the right of each element, and a combined signal trace 28 representing a summation of traces 24 and 26 is shown in FIG. 1-A.

In the system shown in FIG. 1 detection elements 20 and 22 are thermal conductivity chambers utilizing enclosed tungsten wires. For purposes of illustration, the carrier gases in conduits 12 and 14 are hydrogen and nitrogen respectively and the sample analyzed in the traces shown includes hydrogen, nitrogen and methane. Detection element 20 through which the hydrogen carrier gas flows gives no response for hydrogen separated from the sample as it is eluted from column 16 since the sample hydrogen in the carrier gas stream does not represent a change in its composition to which detection element 20 is responsive. Excellent indication of the presence of nitrogen and methane is received from detection element 20 as shown in trace 24. Detection element 22, through which the nitrogen carrier gas stream flows, gives an excellent response for hydrogen present in the carrier gas stream but no response for nitrogen separated from the sample and only a small response for the presence of methane which has a thermal conductivity relatively close to that of the carrier gas. By adding the responses represented by traces 24 and 26 a single graphic analysis for all components is obtained as represented by trace 28 in FIG. 1-A.

Figure 2:
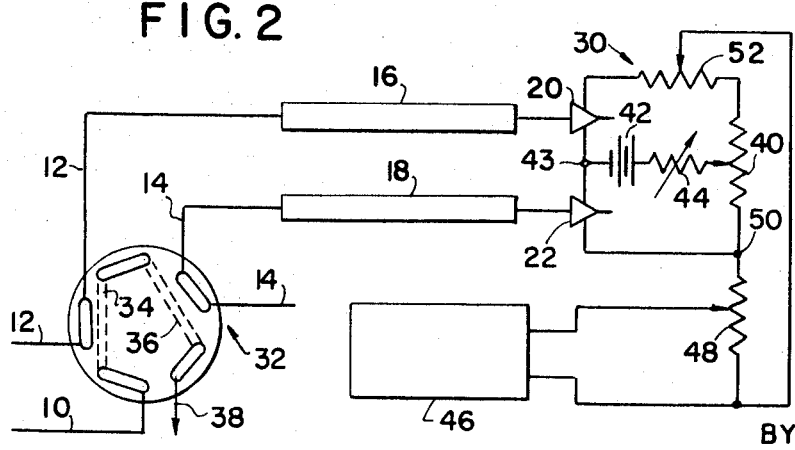
Figure 2A:
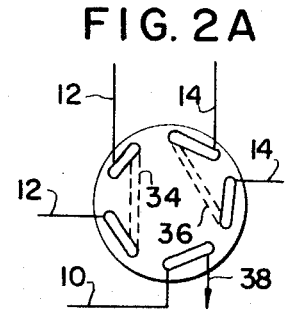

Referring now to FIG. 2 the system shown in FIG. 1 is depicted in greater detail including the incorporation of the detection elements 20 and 22 into a Wheatstone bridge network 30. A sampling valve 32 is shown by which identical samples can be introduced to columns 16 and 18 by carrier gas in conduits 12 and 14. When sampling valve 32 is in the position shown in FIG. 2 it is the stand-by position. A sample gas stream is introduced through sample inlet 10 and passes through sample loops 34 and 36 before leaving valve 32 via sample discharge line 38; in the valve 32 illustrated sample loops 34 and 36 are identical. By rotating valve 32 to the charge position shown in FIG. 2-A the sample stream passes directly from sample inlet 10 to sample discharge 38 and carrier gases in conduit 12 and 14 pass through loops 34 and 36 whereby sample trapped in loops 34 and 36 upon rotation of the valve is swept into conduits 12 and 14 by which each is carried to columns 16 and 18 respectively.

Detection elements 20 and 22 comprise adjacent arms of Wheatstone bridge network 30. Network 30 further includes a coarse balance resistor 40 and a voltage source 42 connected across a terminal 43 intermediate elements 20 and 22 and, through a variable resistor 44, coarse balance resistor 40. An attenuator 48 is connected to terminal 50 intermediate coarse balance resistor 40 and detection element 22, and to a fine balance resistor 52 intermediate cell 20 and coarse balance resistor 40. A recording potentiometer 46 is adjustably connected across attenuator 48.

The system shown in FIG. 2 operates as follows. Valve 32 is turned to the stand-by position shown in FIG. 2 and different carrier gases such as helium and nitrogen respectively are introduced to conduits 12 and 14 and allowed to pass through valve 32 to columns 16 and 18 without passing through loops 34 and 36. A sample gas is admitted through sample inlet 10 and thence through valve 32 including loops 34 and 36, discharging through sample discharge 38. This flow is allowed to continue until an equilibrium state is reached and Wheatstone bridge network 30 is balanced. Sample valve 32 is then turned either automatically or manually to the charge position shown in FIG. 2-A and identical samples of gas trapped in loops 34 and 36 are swept by the carrier gases into conduits 12 and 14 by which they are carried to columns 16 and 18. Sample constituents are successively eluted from columns 16 and 18 by continued flow of the carrier gases through the columns and the binary mixtures of carrier gas and sample constituents pass through detection elements 20 and 22 respectively. Responses from detection elements 20 and 22 in the form of resistance changes appear as a single trace on recording potentiometer 46.

Columns 16 and 18 are chromatographic columns typical of those generally known and used. They may for example be glass tubes of one quarter inch diameter and six foot length, packed with molecular sieve.

Figure 3:
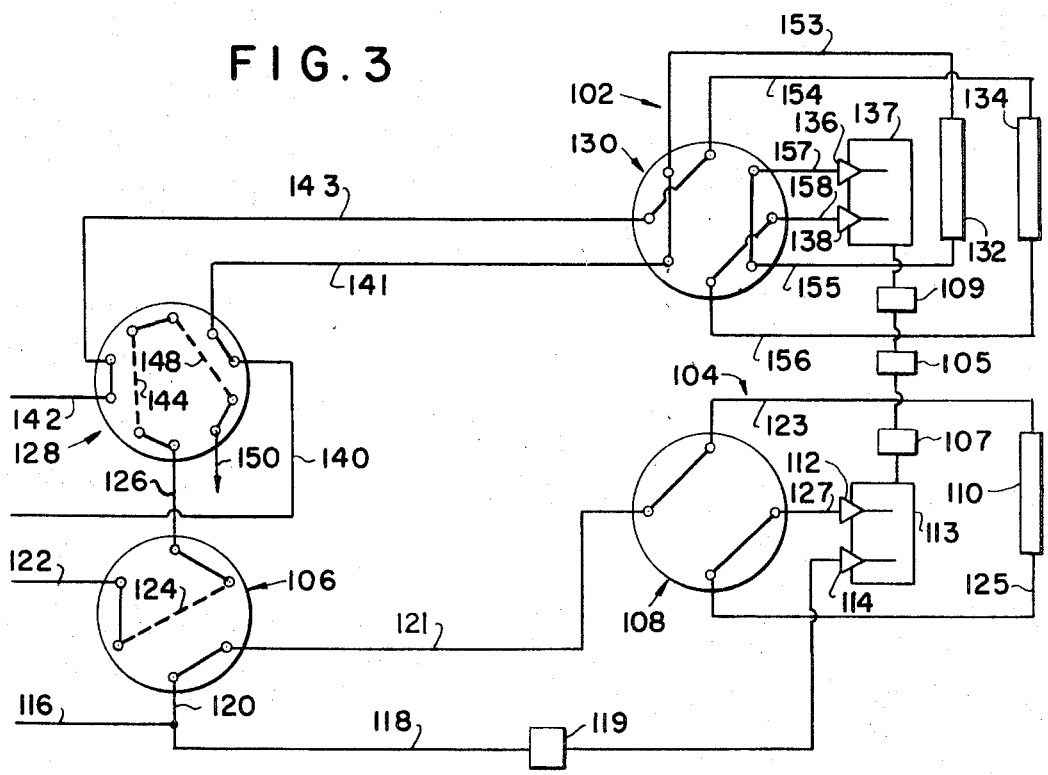
FIG. 3 is a schematic of a variation of the analyzer shown in FIG. 2.

Referring now to FIG. 3 a more elaborate arrangement is shown whereby the analysis system shown in FIG. 2 can be combined with a more conventional system to provide a truly versatile arrangement whereby a sample having a broad range of constituents can be quickly analyzed. The arrangement shown in FIG. 3 consists of two separate chromatographic systems. The first system 102 is similar to that shown in FIG. 2 and the second system 104 is a more conventional system such as those previously known and used. The two systems are combined into a single arrangement utilizing a single recording potentiometer 105 so that an analysis can be conducted by one system while the other system is being backflushed.

System 104 includes a sample valve 106, a backflush valve 108, a chromatographic column 110 and detection elements 112 and 114. A carrier gas inlet 116 connects to two conduits, 118 and 120, conduit 118 passing through a flow restrictor 119 to detection element 114 which acts as a reference chamber and conduit 120 passing to sample valve 106. Sample valve 106 is connected to backflush valve 108 by conduit 121 and backflush valve 108 is connected to both ends of column 110 by conduits 123 and 125 and to detection element 112 by conduit 127.

Sample valve 106 is shown in FIG. 3 in the stand-by position, in which position sample is admitted to sample valve 106 by sample inlet 122 and passes through a sample loop 124 discharging via conduit 126 to the sample valve 128 of system 102. Carrier gas is admitted to sample valve 106 by conduit 120 and passes directly through valve 106 to conduit 121 without passing through loop 124.

Upon 180° rotation of valve 106 to the charge position sample gas admitted through sample inlet 122 passes directly to system 102 through conduit 126 and carrier gas admitted to sampling valve 106 by conduit 120 passes through loop 124 sweeping the entrapped sample from loop 124. The sample is then carried via conduit 121, backflush valve 108 and conduit 123 to chromatographic column 110 from which it is eluted by the carrier gas and carried via conduit 125, backflush valve 108 and conduit 127 to detection element 112 which acts as a sample chamber. Detection elements 112 and 114 comprise adjacent arms of a Wheatstone bridge network represented by box 113 and similar in all respects to that shown in FIG. 2. Wheatstone bridge network 113 is connected to recording potentiometer 105 through switch 107 which allows network 113 to be disconnected when not in use. After the desired resolutions have been conducted in column 110 sample valve 106 is rotated to the stand-by position shown in FIG. 3 and backflush valve 108 is rotated 90° from the position shown in FIG. 3 causing a reverse flow of carrier gas through column 110 which flushes any heavier unresolved components from column 110.

System 102 in FIG. 3 utilizes two carrier gases and is similar to the system shown in FIG. 2. System 102 includes sample valve 128, backflush valve 130, two substantially identical chromatographic columns 132 and 134 and two detection elements 136 and 138. Carrier gas is admitted to sample valve 128 via two carrier gas conduits 140 and 142 and conduits 141 and 143 connect sample valve 128 to backflush valve 130. Backflush valve 130 is connected to both ends of columns 132 and 134 by four conduits 153, 154, 155 and 156 and to two detection elements 136 and 138 by conduits 157 and 158.

When sample valve 128 is in the stand-by position shown in FIG. 3 sample admitted via conduit 126 passes through sample loops 144 and 148 and is discharged via sample discharge conduit 150. Carrier gases admitted by conduits 140 and 142 pass directly through sample valve 128 without passing through loops 144 and 148. Upon rotation of sample valve 128 to the charge position (about 36° rotation) sample admitted through conduit 126 is discharged through sample discharge conduit 150 directly and the carrier gases entering via conduits 140 and 142 pass through sample loops 144 and 148 whereby sample entrapped in these loops upon rotation of the valve is swept into conduits 141 and 143.

Upon completion of the desired separation in columns 132 and 134 sample valve 128 is rotated to the stand-by position shown in FIG. 3 and backflush valve 130 is rotated 90° from the position shown in FIG. 3 causing a reverse flow of carrier gas through columns 132 and 134 which flushes unresolved components.

Detection elements 136 and 138 comprise adjacent arms of a Wheatstone bridge represented by box 137 in FIG. 3 and similar in all respects to that shown in FIG. 2. Wheatstone bridge 137 is connected to recording potentiometer 105 through switch 109 which allows it to be disconnected when not in use. Recording potentiometer 105 combines the analyses of systems 102 and 104 into a single chromatographic trace.

In operation of the arrangement shown in FIG. 3, system 102 is first brought to an equilibrium state by passing two different carrier gases such as hydrogen and nitrogen through the system with sample valve 128 and backflush valve 130 in the positions shown in FIG. 3. Switches 107 and 109 are adjusted so that recording potentiometer 105 is monitoring Wheatstone bridge 137 which is then balanced. Sample gas is passed through loops 144 and 148 and when equilibrium is reached valve 128 is rotated to the charge position and sample trapped in loops 144 and 148 is swept into columns 132 and 134 which are designed to resolve the more volatile components of the system. For example, columns 132 and 134 may be ¼" O.D. x 6' glass tubes packed with molecular sieve having a pore diameter of 13 angstroms. Such a column can be used for analysis of a sample containing hydrogen, oxygen, nitrogen, carbon monoxide and methane which are eluted in that order. After elution of the methane, backflush valve 130 is rotated either automatically or manually and columns 132 and 134 are simultaneously backflushed by the carrier gas, preferably at elevated temperatures.

During backflushing of columns 132 and 134 system 104 is used to separate the less volatile components of the sample. The system is brought to an equilibrium state by passing a carrier gas such as hydrogen or helium through the system. After recording the presence of methane eluted from columns 132 and 134 in system 102 the recording potentiometer is switched to monitor Wheatstone bridge 113 and sample valve 106 is rotated to the charge position whereby sample trapped in loop 124 is swept by the carrier gas into column 110. The flow of carrier gas through column 110 is continued until the less volatile components of the sample are successively eluted and the binary mixture of carrier gas and sample components is passed through detection element 112 which signals their presence to the recording potentiometer in the form of resistance changes. After the desired separations are accomplished by column 110, backflush valve 108 can be rotated to reverse the flow of carrier gas through column 110 flushing the unresolved heavier components from the column.

Column 110 can be any presently used chromatographic column capable of affecting the desired separations. For example, column 110 may be a gas-liquid partition column consisting of 20 ft. of ¼" tubing packed with crushed firebrick coated with 13% 4-benzylpyridine and used for analysis of $C_2$ through $C_6$ hydrocarbons. The carrier gas used in system 104 is generally one of the higher thermal conductivity gases such as hydrogen or helium.

Figure 4:
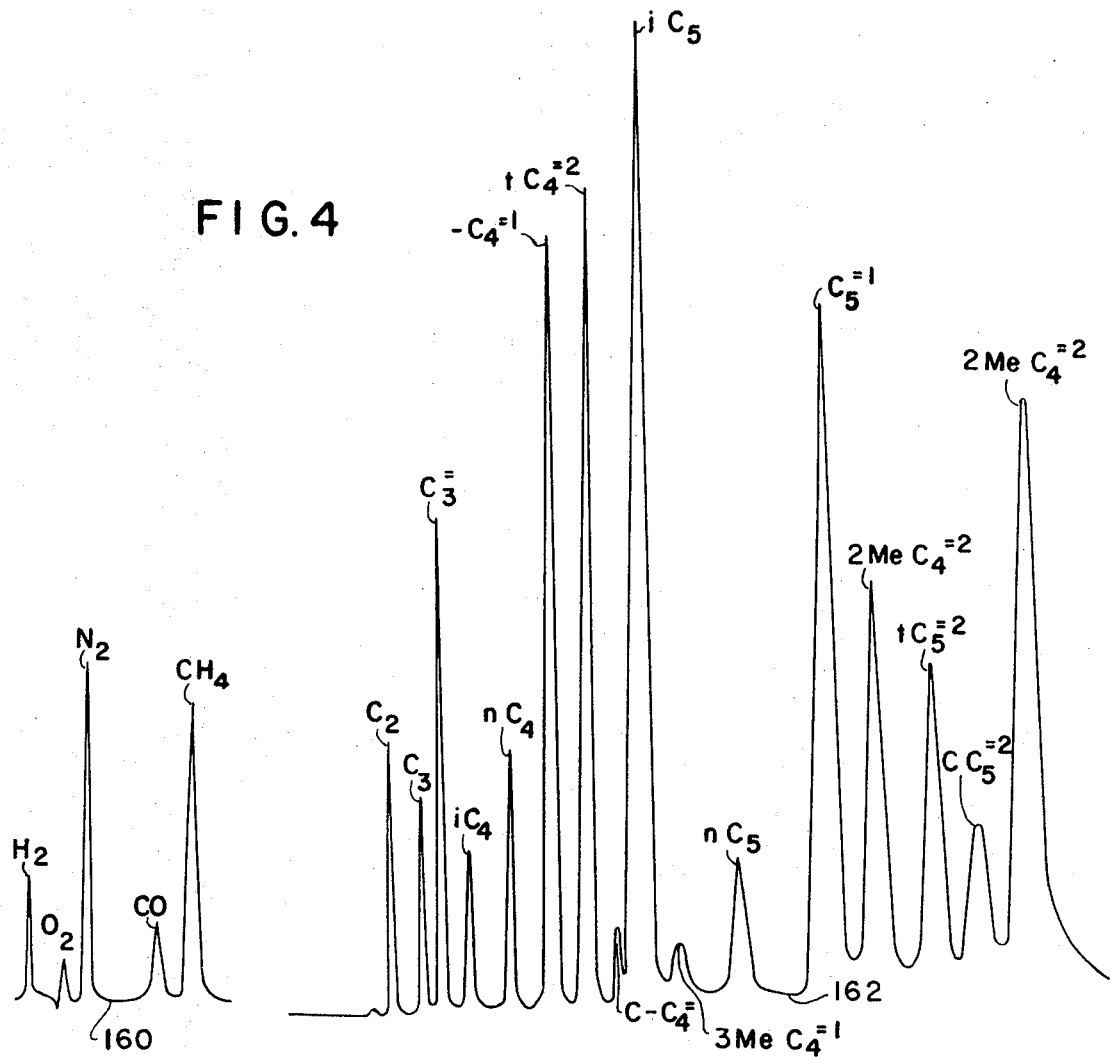
FIG. 4 is a graphic trace showing an analysis conducted by the analzyer shown in FIG. 3.

FIG. 4 is a chromatographic trace representing the analysis of a sample using the arrangement shown in FIG. 3. The sample was analyzed for hydrogen through $C_5$ hydrocarbons. In conducting the analysis of FIG. 4, columns 132 and 134 where ¼" x 6 ft. tubes packed with molecular sieve having 13 angstroms pore diameter and column 110 was a 20 ft. x ¼" tube packed with 13% 4-benzylpyridine on crushed firebrick. Helium and nitrogen were used as carrier gases in system 102 and helium was used in ssytem 104. The temperature of columns 132 and 134 was maintained between 25 and 40° C. and column 110 was maintained at 27° C. throughout analysis which took about ½ hour to complete. The trace shown in FIG. 4 includes a first portion 160 representing separations accomplished using system 102, i.e., the hydrogen through methane separation; and a second portion 162 representing the separation conducted using system 104, i.e., the $C_2$ through $C_5$ separation. As will be seen from the drawing, excellent sensitivity for all components was achieved including hydrogen and nitrogen which were present in the sample.

It is necessary to the realization of a single analytical report that the two columns of the system shown in FIG. 2 and the two columns of system 102 in FIG. 3 be substantially identical, i.e., that sample constituents be discharged simultaneously from both columns. Substantial identity of the columns can be realized by constructing the columns as nearly alike as possible and by including at their inlets suitable orifices or valves to control the flow of gases through the columns. A pair of columns can be checked for substantial identity by eluting two samples of a single component gas such as methane from both columns. If the columns are substantially identical the samples will be discharged from both columns at the same time. If this does not occur, the inlet valves and orifices are adjusted and the columns are checked again. This procedure is repeated until the desired simultaneous discharge is achieved. The identity of the columns must be checked any time that a carrier gas or the temperature of a column is changed.

While I have described my invention with reference to the appended drawings, many variations of the analytical systems shown will be obvious to persons familiar with chromatographic analytical procedures. For example, the chromatographic columns used in the practice of the present invention can be of the controlled temperature type whereby the temperature of the columns is maintained at a fixed temperature throughout a given analysis or the temperature of the columns may be constantly changed at a predetermined rate throughout the analysis. Similarly, the backflush valve and associated conduits shown in system 102 of FIG. 3 can be incorporated into the system shown in FIG. 2. It will also be obvious that a Wheatstone bridge having four thermal conductivity chambers, one in each arm, may be substituted for that shown in the drawings. In this instance, the effluent from each chromatographic column is passed through the two chambers comprising one side of the brige network.

I claim:

1. A method for analyzing a fluid which includes introducing measured samples of said fluid to two substantially identical chromatographic columns using two different carrier gases, continuing the flow of said carrier gases through said columns to successively elute the constituents of said samples therefrom, passing the binary mixture of carrier gas and sample constituents discharged from one column through a first detection element which is responsive to changes in the composition of gases passing therethrough, passing the binary mixture of carrier gas and sample constituents discharged from the other column through a second detection element which is responsive to changes in the composition of gases passing therethrough and combining the responses from said first and second detection elements.

2. The method of claim 1 wherein said samples are identical and said detection elements are thermal conductivity chambers comprising adjacent arms of a Wheatstone bridge.

3. The method of claim 1 wherein said samples are identical one of said carrier gases is selected from the group consisting of hydrogen and helium and the other said carirer gas is nitrogen and said detection elements are thermal conductivity chambers comprising adjacent arms of a Wheatstone bridge.

4. An apparatus for the chromatographic analysis of a gas which includes a first and a second carrier gas conduit, means for introducing measured gas samples into said first and second carrier gas conduits, first and second, substantially identical, chromatographic columns each having an inlet end and a discharge end, said first and said second carrier gas conduits being connected to the inlet ends of said first and said second chromatographic columns respectively, first and second detection means responsive to changes in the composition of gases passing therethrough, conduit means interconnecting the discharge ends of said first and said second chromatographic columns with said first and said second detection means respectively, and means for combining responses from said first and said second detection means.

5. An apparatus according to claim 4 wherein said first and second detection means are thermal conductivity chambers comprising adjacent arms of a Wheatstone bridge.

6. An apparatus according to claim 4 which further includes a third and a fourth carrier gas conduit, means for introducing a gas sample into said third carrier gas conduit means, a third chromatographic column having an inlet end and a discharge end, said third carrier gas conduit means being connected to the inlet end of said third chromatographic column, third and fourth detection means responsive to changes in the composition of gases passing therethrough, conduit means interconnecting the discharge end of said third chromatographic column with said third detection means, said fourth carrier gas conduit being connected to said fourth detection means, and means for combining responses from said third and fourth detection means.

7. Apparatus according to claim 6 which further includes means for reversing the direction of flow of said carrier gas streams through said chromatographic columns.

8. A method for analyzing a gas which includes introducing identical samples of said gas to two substantially identical chromatographic columns using two different carrier gases, continuing the flow of said carrier gases through said columns to successively elute the more volatile constituents of said samples therefrom, passing the binary mixture of carrier gas and sample constituents discharged from one column through a first detection element, passing the binary mixture of carrier gas and sample constituents discharged from the other column through a second detection element, combining responses from said first and second detection elements, introducing a sample of said gas to a third chromatographic column using a third carrier gas, continuing the flow of said third carrier gas through said third column to successively elute the less volatile constituents of said sample therefrom, passing the binary mixture of said third carrier gas and sample constituents from said third column through a third detection element, passing a stream of said third carrier gas through a fourth detection element and combining the responses from said third and fourth detection elements.

9. A method for analyzing a stream of gases containing high and low thermal conductivity components comprising introducing a first sample of said gas stream into a high thermal conductivity carrier gas and passing said high thermal conductivity carrier gas and first sample to a first gas chromatographic column while simultaneously introducing a second sample of said gas stream into a low thermal conductivity carrier gas and passing said low thermal conductivity carrier gas and second sample to a second gas chromatographic column to separate the components of said samples, detecting said components of said first and second samples in first and second thermal conductivity detection zones, respectively, and integrating the detected signal from said first and second thermal conductivity detection zones to yield a composite representation of the components of said first and second samples.

References Cited
UNITED STATES PATENTS

| | | | |
|---|---|---|---|
| 3,097,518 | 7/1963 | Taylor | 23—232C |
| 3,111,835 | 11/1963 | Jenkins | 23—232C |
| 3,112,639 | 12/1963 | Maxwell | 73—231 |

OTHER REFERENCES

Boeke, J., Gas Chromatography, Edinburgh, 1960, Scott, pp. 100-101.

MORRIS O. WOLK, Primary Examiner

R. M. REESE, Assistant Examiner

U.S. Cl. X.R.

55—197; 73—23.1